Jan. 12, 1954

C. MINGIONE 2,665,494

CARBON INDICATOR FOR FILM PROJECTORS

Filed Nov. 13, 1952

INVENTOR.
Carl Mingione
BY Myron J. Dikeman
ATTORNEY

Jan. 12, 1954

C. MINGIONE 2,665,494

CARBON INDICATOR FOR FILM PROJECTORS

Filed Nov. 13, 1952

INVENTOR.
Carl Mingione
BY Myron J. Dikeman
ATTORNEY

Patented Jan. 12, 1954

2,665,494

UNITED STATES PATENT OFFICE 2,665,494

CARBON INDICATOR FOR FILM PROJECTORS

Carl Mingione, Detroit, Mich.

Application November 13, 1952, Serial No. 320,309

2 Claims. (Cl. 33—172)

This invention relates to a dual structure adapted for both the positive and negative carbon units as now commonly used in moving picture projector machines.

The object of my invention is to produce a simplified dual measuring unit for accurately determining the required lengths of the respective carbon units for any specific picture projector film reel.

Another object is to produce a dual carbon indicator that may be readily adjusted to any type of picture projector machine, and likewise adjustable to variable electric current amperage as applied thereto.

A further object is to produce a dual carbon indicator that is simple in construction, easily and efficiently operated, and that can be manufactured at a very low cost.

These several objects are attained in the preferred form, by the construction and arrangement of parts as are more fully hereinafter set forth.

Similar parts on all drawings are marked by similar numerals or letters.

Figure 1:
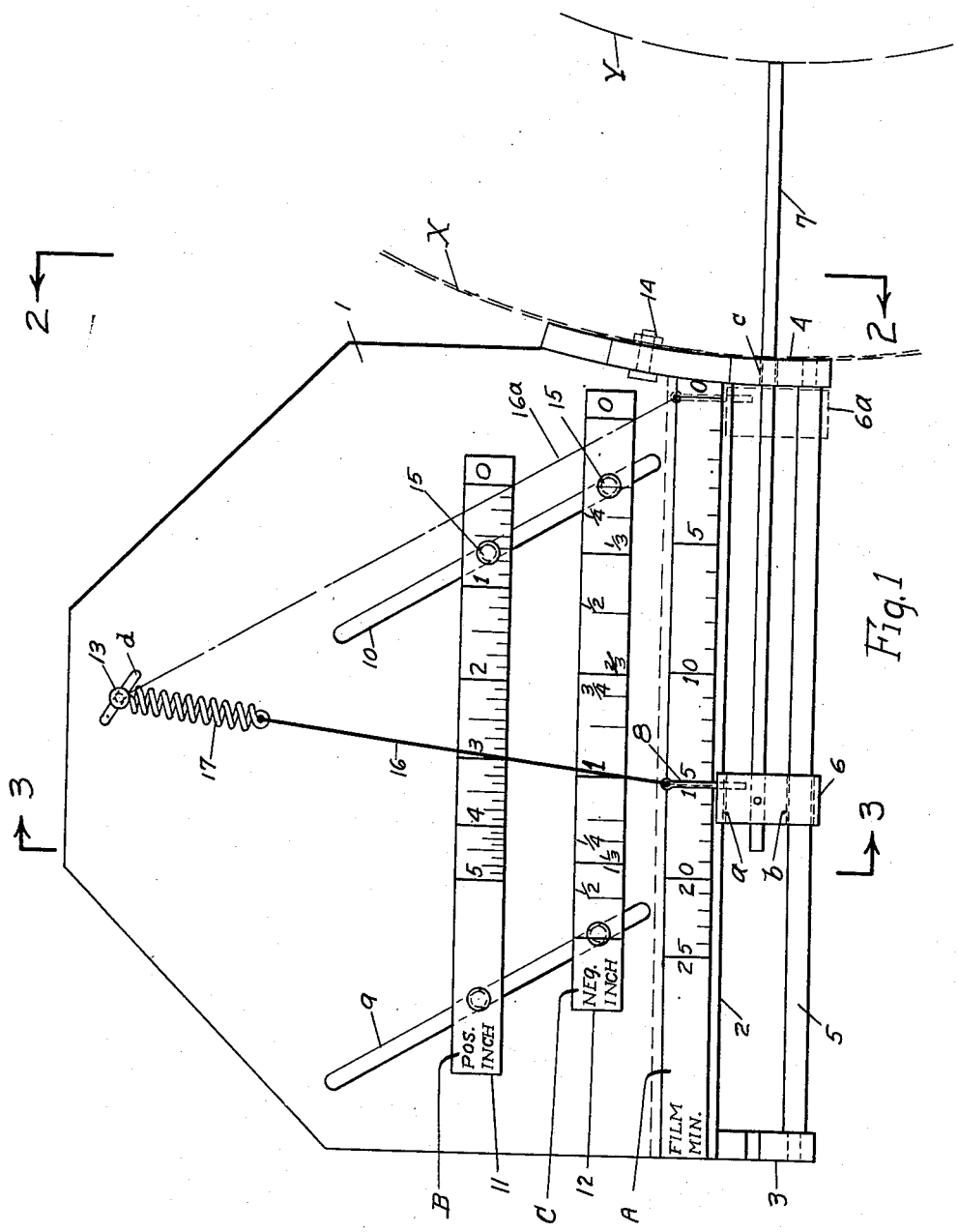
Fig. 1 is a plan view of the assembled device showing the general arrangement of the working parts.
Figure 2:
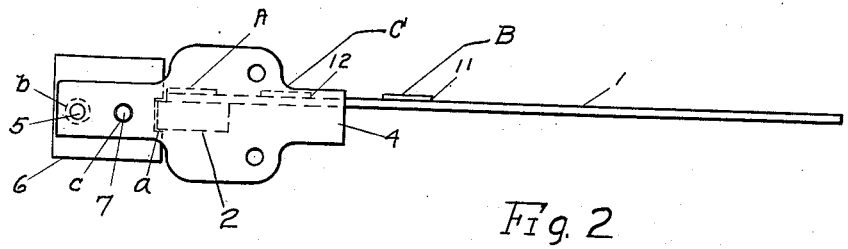
Fig. 2 is an end view along the line 2—2 of Fig. 1, showing the attaching means for mounting the unit on a moving picture projector reel drum.
Figure 3:
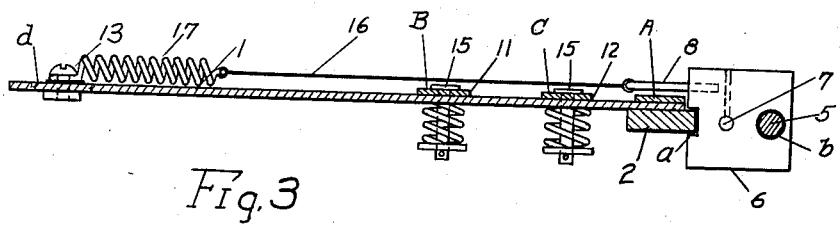
Fig. 3 is a cross-sectional view taken on the line 3—3 of the Fig. 1, showing the relative position of the various operating parts.

It is pointed out that the moving picture projector machine as now in common use, is designed for receiving rotatably mounted film reels therein and which are reflected through special projector lens by means of powerful arc-carbon lights of various standard designs. The carbon units comprise both positive and negative carbon elements usually mounted within adjustable automatic slide supports positioned in alignment so the respective adjacent carbon ends may be adjusted to pre-determined spacing as an electric current is passed therethrough. The positive carbon element being consumed much faster than the adjacent negative element, and therefore requires a greater carbon length than the negative unit, for producing uniform operation.

It is also known that the film reels vary in length and size according to the actual film exposure time, and therefore each may require different time lengths for the projector reproduction on the screen, and that the rapidly consumed arc-carbon elements must each be of sufficient length for continuous film projection, without interruption, or brake therein, therefore sufficient carbon lengths for both the positive and negative elements must be provided before starting the projector machine. My device is adapted for accurately indicating the full necessary information.

In general, my device comprises a flat base plate designed for fixedly mounting on a film reel drum, at right angles thereto, positioned opposite the film reel unit. The base plate is provided with a series of adjustable tabulating scale members, each designed with special graduation scales, all readable by means of a single common indicator member functioning directly with the projector reel film roll.

The base plate 1 is semi-rectangular in form, preferably with outer clipped corners, and is provided with a rectangular slide bar 2 fixedly mounted along one side edge, extending the full length thereof. The slide bar 2 is formed with bearing support arms 3 and 4 at opposite ends, projected at right angles to the bar side wall, designed for receiving a slide bar 5 rigidly mounted therein, positioned parallel to the adjoining slide 2. The inner support arm 4 being curved for fitting the film reel drum X wall and is fixedly attached thereto by means of bolts 14, or any other suitable means. A rectangular operating slide block 6 formed with special slide recesses a and b therethrough is slidably mounted over the parallel slide bars 2 and 5, operative for the full length thereof. Also through the central slide block section is rigidly mounted an operating indicator rod 7, positioned parallel with the inclosing slides 2 and 5, and is extended through the bearing c formed in the inner support arm 4, projecting said rod 7 within the film reel drum chamber, positioned to engage and contact the reel film surface Y during the projector operations. A graduated "time" indicator scale A is fixedly mounted on the base plate surface 1, positioned parallel with the slide 2. The slide block 6 is provided with an extended scale indicator pin 8 projected at right angles from the inner wall. The base plate 1 is designed with two parallel angular tabulator recesses 9 and 10, preferably positioned at sixty degree angles with the adjoining slide bar edge, although it may be set at other angles, if desired, and carries slidably mounted therein dual tabulator bars 11 and 12, both bars being slidably retained thereon by means of special spring operated attaching bolts 15. The bars 11 and 12 being also positioned to always remain parallel to the slide 2, said bars being adjustable along the recesses 9 and 10 to any desired position, and are provided with graduated scales B and C respectively. Near the outer edge of the base plate 1, on the side opposite bar 2, is mounted a special adjustable indicator post 13 which carries an attached indicator line 16 also connected to the slide indicator pin 8, and which is retained taut by an intervening coil spring 17 mounted within the line. The post 13 is adjusted within its supporting slot $d$ to a position for placing the indicator line 16 parallel with the angular plate grooves 9 and 10, as indicated by the dotted line 16a when the slide block 6 is at its "zero" position as indicated by the dotted lines 6a in the Fig. 1 of the drawings.

The "time" scale A is divided into one minute spacings, grouped in five minute sections, each section graduated to corresponding time durations and drum spacing for the operating projector film at some pre-determined speed, normally at about ninety feet per minute time. Inasmuch as the rotating reel film roll reduces in diameter more slowly when the reel is full, the respective graduation sections are shortest at the original film contact point, and increased in the successive sections as the contacted reel film diameter is decreased.

Both the "positive" and "negative" carbon indicator scales B and C, are graduated in "inches" to indicate the length of the respective carbon units required for any given "time" of film projector operations. Inasmuch as the carbon units vary in actual "consumption time" by reason of different structural composition, and by different electric amperes used, it is necessary to first make preliminary projector tests for both the carbon units prior to making the scale graduations therefor. Standard scales may be prepared for the varying grades for both scales B and C respectively. Trial tests have shown that the "positive" carbon element will burn about three inches of length per each fifteen minute projector operation, while the "negative" carbon unit will be consumed at the rate of only one inch in length in like time. The special graduations indicated in the Fig. 1, are arranged in these proportions, but of course, may be varied as conditions may require.

Figure 4:
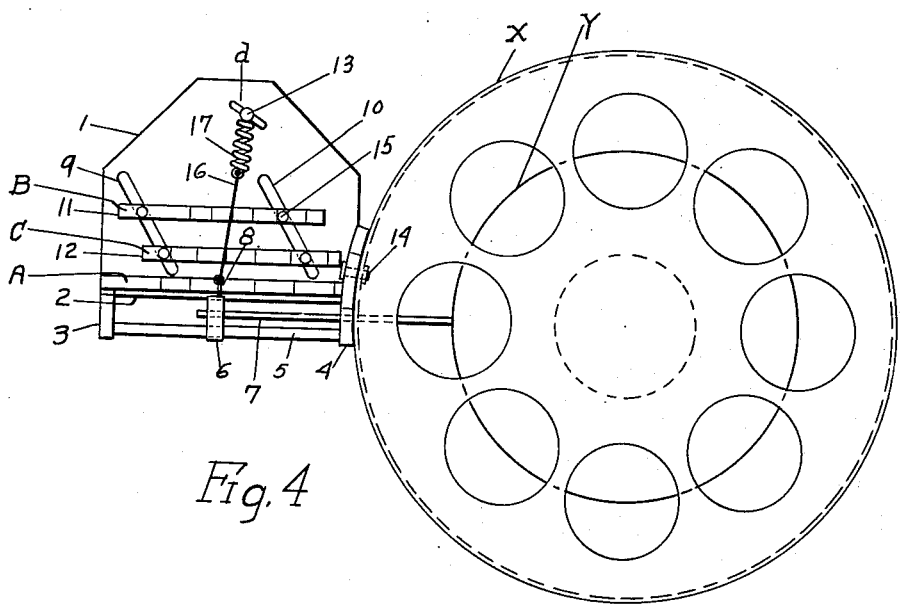
Fig. 4 is an assembly plan view illustrating my device when mounted on a moving picture projector reel drum, ready for operation.

Assuming the reel film Y as mounted with the projector drum X, is sufficient for exact fifteen minute projector operation, the scale indicator pin 8 of the slide block 6, will coincide with the exact fifteen minute scale graduation on the "time" scale A, as the operating rod 7 contacts the reel film Y, as indicated in the Figs. 1 and 4 of the drawings. By readjustment of both "positive" and "negative" tabulator bars 11 and 12 to operative positions placing the 3" graduation of the scale B, and the 1" graduation of the scale C, both directly beneath the indicator line 16, as indicated in the Fig. 1, then the successive movements of the block pin 8 in either direction will indicate the exact carbon lengths as will be required for the film "time" indicated on the scale A.

Where the change of amperes may require slight readjustment of both scales B and C, the respective scales may be moved to bring the proper indicator characters beneath the indicator line at the initial setting.

The "positive" and "negative" tabulator bars B and C may also be interchanged in position, if desired, by the rearrangement of the respective graduations accordingly. The operation is the same as previously described.

Having fully described my carbon indicator for film projectors, what I claim as my invention and desire to secure by Letters Patent is:

1. A carbon indicator for moving picture projector machines provided with film reel and drum casing, and used therewith, comprising a flat rectangular base plate designed for fixedly mounting on the projector film reel drum at right angles to the axis thereof, parallel slide members rigidly mounted along one base plate side, an indicator slide block slidably mounted on said base plate slides, movable in both directions, an indicator rod fixedly mounted on said slide block and projected within the film roll drum chamber engageable with the reel film surface, a series of "time" and "carbon" tabulating scale members mounted on said base plate, each parallel with the slide members, each scale being designed with different scale indicator graduations thereon, and a spring adjustable indicator arm pivotally mounted on the opposite base plate side and operatively connected to said slide block, said indicator arm being positioned to move over all scale members in common for indicating the readable graduations on the respective scales corresponding to the reel film.

2. A dual carbon indicator for moving picture projector machines provided with film reel and drum casing, and used therewith, comprising a rectangular flat base plate section and designed for fixedly mounting on a film reel drum, at right angles to the axis thereof, said base plate being mounted opposite the inclosed film reel, parallel slide bars fixedly mounted along one base plate side, an indicator slide block slidably mounted on said parallel slides, operative in either direction thereon, an indicator rod fixedly mounted on said slide block and projected to within the film reel drum chamber engageable with the reel film surface, a graduated film "time" scale member mounted on said base plate edge adjacent the parallel slides and designed for measuring the reel film duration, dual graduated carbon scales, for measuring required lengths of carbon, adjustably mounted on said base plate, both positioned parallel with the "time" scale, and a spring actuated cord indicator member pivotally mounted on the opposite edge of said base plate and operatively connected to the slide indicator block, said cord indicator being positioned to move over all scale members in common, for indicating the readable graduations of required carbon lengths corresponding with the indicated film duration.

CARL MINGIONE.

References Cited in the file of this patent

UNITED STATES PATENTS

| Number | Name | Date |
| --- | --- | --- |
| 554,524 | Mings | Feb. 11, 1896 |
| 1,538,510 | Bonk | May 19, 1925 |
| 2,007,400 | Lemaire | July 9, 1935 |